(12) United States Patent
Mitchell et al.

(10) Patent No.: US 11,371,694 B2
(45) Date of Patent: Jun. 28, 2022

(54) FIRE TUBE

(71) Applicant: TRINITY ENDEAVORS, LLC, Stanley, ND (US)

(72) Inventors: Ty Mitchell, Stanley, ND (US); Dominic Darnick, New Castle, WY (US); Ricky Alexander, Minot, ND (US)

(73) Assignee: TRINITY ENDEAVORS, LLC, Stanley, ND (US)

( * ) Notice: Subject to any disclaimer, the term of this patent is extended or adjusted under 35 U.S.C. 154(b) by 285 days.

(21) Appl. No.: 16/347,693

(22) PCT Filed: Dec. 7, 2017

(86) PCT No.: PCT/US2017/065157
§ 371 (c)(1),
(2) Date: May 7, 2019

(87) PCT Pub. No.: WO2018/118452
PCT Pub. Date: Jun. 28, 2018

(65) Prior Publication Data
US 2019/0316770 A1    Oct. 17, 2019

Related U.S. Application Data

(60) Provisional application No. 62/437,864, filed on Dec. 22, 2016.

(51) Int. Cl.
*F22B 9/08*    (2006.01)
*F22B 9/18*    (2006.01)
(Continued)

(52) U.S. Cl.
CPC ............ *F22B 9/08* (2013.01); *F22B 9/12* (2013.01); *F22B 9/18* (2013.01); *F22B 37/025* (2013.01); *F22B 37/06* (2013.01); *F24H 8/00* (2013.01)

(58) Field of Classification Search
CPC ...... F22B 9/08; F22B 9/12; F22B 9/18; F22B 37/025; F22B 37/06; F24H 8/00;
(Continued)

(56) References Cited

U.S. PATENT DOCUMENTS 2,101,270 A * 12/1937 Rice .................. C21B 7/163
                                                      138/100
4,179,328 A    12/1979 Barra et al.
(Continued)

FOREIGN PATENT DOCUMENTS

| CN | 202141031 U | 2/2012 | |
| FR | 2555296 A1 * | 5/1985 | ............ F23C 3/002 |
| WO | WO-9604511 A1 * | 2/1996 | ............ F23M 5/00 |

OTHER PUBLICATIONS

International Search Report dated Feb. 22, 2018 in International Application Serial No. PCT/US2017/065157.
(Continued)

*Primary Examiner* — Steven B McAllister
*Assistant Examiner* — Charles R Brawner
(74) *Attorney, Agent, or Firm* — Ryan Kromholz & Manion, S.C.

(57) ABSTRACT

A fire tube with three hollow tube sections, two of which are parallel to each other and one of which is perpendicular to and connects the ends of the first two tube sections. The bottom-most tube section, which contains the burner, has an inner ceramic liner that is made up of one or more separate ceramic tubular sections. An upper set of cooling funs surrounds the top part of the bottom-most tube section, and a lower set of cooling fins surrounds the bottom part of the bottom-most tube section.

14 Claims, 15 Drawing Sheets

(51) Int. Cl.
*F22B 37/02* (2006.01)
*F22B 37/06* (2006.01)
*F24H 8/00* (2022.01)
*F22B 9/12* (2006.01)

(58) Field of Classification Search
CPC ......... F28D 1/05366; F28D 2021/0024; F28D 2021/0059; F28D 21/001; F28F 1/022; F28F 1/24; F28F 2210/02; F28F 21/083; F28F 21/087; F28F 19/02; F23J 15/06; F23C 3/002; C10G 33/00; C10G 7/04
USPC ....................................................... 122/44.1
See application file for complete search history.

(56) References Cited

U.S. PATENT DOCUMENTS

| | | |
|---|---|---|
| 4,691,766 A | 9/1987 | Wurz et al. |
| 5,205,276 A | 4/1993 | Aronov et al. |
| 5,758,720 A | 6/1998 | Moser |
| 5,870,825 A | 2/1999 | Moser |
| 5,941,303 A | 8/1999 | Gowan et al. |
| 6,435,266 B1 | 8/2002 | Wu |
| 6,827,132 B1 | 12/2004 | Lin |
| 7,413,004 B2 | 8/2008 | Okonski, Sr. et al. |
| 8,820,395 B2 | 9/2014 | Yatskov |
| 2005/0023228 A1* | 2/2005 | Fenwick ................. B01D 17/00 210/802 |
| 2010/0012308 A1* | 1/2010 | Scheidegger ........... F28F 19/06 165/182 |
| 2012/0145373 A1 | 7/2012 | Chadwick |
| 2012/0255716 A1 | 10/2012 | Wu et al. |
| 2016/0047606 A1 | 2/2016 | Wada et al. |
| 2016/0305651 A1* | 10/2016 | Lloyd ..................... C23C 24/04 |
| 2016/0327350 A1* | 11/2016 | Jadidian ................ B23K 1/0006 |
| 2017/0355006 A1* | 12/2017 | Allen ................... B21D 19/046 |

OTHER PUBLICATIONS

Search Report dated Feb. 22, 2018 in International Application Serial No. PCT/US2017/065157.

* cited by examiner

FIRE TUBE

CROSS-REFERENCE TO RELATED APPLICATION

Pursuant to 35 U.S.C. § 119(e), this application claims the benefit of U.S. Provisional Application No. 62/437,864, filed on Dec. 22, 2016, the contents of which are incorporated herein by reference.

BACKGROUND OF THE INVENTION

1. Field of the Invention

The present invention relates generally to the field of oil and gas equipment, and more specifically, to an improved fire tube for use in connection with a heater-treater, which is a vessel used in the oil and gas industry to break oil-water emulsions so that the oil can be accepted by a pipeline or other method of transport.

2. Description of the Related Art

Fire tubes typically experience a relatively short service life because of the temperatures and stresses to which the fire tube is exposed. The fire tube is used to heat fluids, which are passed through the treater vessel (heater-treater). The short life span of the fire tube is due primarily to the presence of corrosive fluids surrounding the tube and the fact that excessive heat is applied to the fire tube, thereby causing rapid pitting and corrosion to the fire tube wall. Conventional fire tubes have been made of carbon steel, which is susceptible to corrosion. Various types of coatings have been used by some manufacturers in an attempt to protect the metal tube, but these coatings burn off relatively quickly because of the high temperatures needed to heat the fluids surrounding the fire tube.

Currently available fire tubes last from a minimum of two to three months to a maximum of several years before they must be replaced. Carbon steel fire tubes are usually subject to a preventative maintenance schedule for inspections to observe the effects of corrosion on the tube during its lifetime. Many tubes are being replaced at these inspection intervals, while others are put back into service only to undergo another inspection six months later. These procedures result in additional costs and well shut-ins. To perform the preventative maintenance inspection, oil producers have to shut-in the well, drain the treater vessel, pull the fire tube, clean the sludge from the tube, and then visually inspect it for corrosion. This process is expensive, and it also poses environmental hazards due to spills and leaks caused by removing the fire tubes in the field.

U.S. Pat. No. 4,691,766 (Wurz et al., 1987) describes a finned tube arrangement for heat exchangers in which a plurality of first flow guide members are arranged in parallel to annular fins and a plurality of second flow guide members arranged transversely to such fins. The fins are mounted concentrically on and extending radially from a plurality of parallel tubes comprising the heat exchanger assembly.

U.S. Pat. Nos. 5,758,720 and 5,870,825 (Moser, 1998) disclose a heat exchanger assembly comprising a plurality of hollow tubes and a bridge interconnecting adjacent tubes. Each bridge includes holes extending through the bridge to allow airflow therethrough. The holes are cut into the bridges by cutting tongues into the bridges and bending the tongues transversely to the tubes. Fin modules are optionally inserted into each hole between the hollow tubes to provide additional heat exchange characteristics.

U.S. Pat. No. 5,941,303 (Gowan et al., 1999) involves a heat exchanger comprised of a pair of identical manifolds and a plurality of parallel heat exchanger tubes extending between them. Each of the manifolds has an interior dividing wall extending longitudinally within the manifold. Each dividing wall includes a number of vertical webs and two transverse webs extending outwardly from each vertical web. The manifolds may be of different geometries.

U.S. Pat. No. 6,435,266 (Wu, 2002) discusses a radiator with a plurality of fins closely arranged side by side, each of which fin has a hole through which a heat pipe extends. The radiator is configured so that an entire circumferential surface of the heat pipe is in contact with the fins to enable heat transfer from the heat pipe to the fins. A bonding agent is used to bond the heat pipe and fins together.

U.S. Pat. No. 6,827,132 (Lin, 2004) provides a radiation apparatus with first and second board chambers, a condenser tube, and an evaporation tube, all of which jointly form a closed space that contains working fluid. The working fluid absorbs energy from a heat-generating element and vaporizes to flow through the first board chamber to the condenser tube, where the working fluid is condensed into liquid and flows through the second board chamber to the evaporation tube to initiate another dissipation cycle.

U.S. Pat. No. 8,820,395 (Yatskov, 2014) discloses cooling systems and heat exchangers for computer systems. The computer system includes a computer cabinet with an air inlet, an air outlet, and a plurality of computer module compartments positioned between the air inlet and outlet. A heat exchanger is positioned between two adjacent computer module compartments. The heat exchanger has a plurality of heat exchange elements that are canted relative to the air flow path defined by the air inlet, air outlet and computer module compartments.

U.S. Patent Application Pub. No. 2012/0255716 (Wu) describes a heat dissipation device with a first chamber defining a first cavity, a second chamber defining a second cavity, and multiple connection members defining passageways. Working fluid in the first cavity is heated, vaporizes, and then passes through the passageways into the second cavity, where it is condensed into a liquid state. The working fluid then passes through the passageways to the first cavity, where it vaporizes, thereby completing U.S. Patent Application Pub. No. 2016/0047606 (Wada et al.) provides a heat transfer fin comprised of a plate-like base section, a cylindrical collar section, and a recessed section that has a sloped surface and a flared section that is in surface contact with the sloped surface of another heat transfer fin. The recessed section has an inclined surface that is configured to couple a root of the collar section with the base part.

Although the above prior art references describe various heat transfer systems and devices, none of these inventions relates to a fire tube, and none of them possesses the particular combination of structural features described in detail below.

BRIEF SUMMARY OF THE INVENTION

The present invention is a fire tube comprising: a first tube section comprised of a length of hollow tube, a second tube section comprised of a length of hollow tube, and a third tube section comprised of a length of hollow tube, wherein the third tube section is situated at a rear end of each of the first and second tube sections and is oriented so that a longitudinal axis of the third tube section is perpendicular to a longitudinal axis of each of the first and second tube sections, wherein the first tube section comprises an open front end that terminates in a first flange, wherein the second tube section comprises an open front end that terminates in a second flange, and wherein the first, second and third tube sections are configured to provide a fluid channel through the open end of the first tube section at the first flange, through the first tube section, through the third tube section, through the second tube section, and out the open end of the second tube section at the second flange; a plurality of cooling fins that are configured to surround at least a portion of a mid-section of the first tube section, wherein the plurality of cooling fins comprises an upper set of cooling fins that surrounds an upper part of the first tube section and a lower set of cooling fins that surrounds a lower part of the first tube section; and a tubular and hollow ceramic liner that is situated inside of the first tube section, the ceramic liner comprising one or more separate tubular sections.

In a preferred embodiment, the ceramic liner comprises two or more separate tubular sections, each of which comprises a front end with a circumferential recess and a rear end with a circumferential protrusion that is configured to fit into the circumferential recess on the front end of an adjacent tubular section. Preferably, the ceramic liner has a length and a position within the first tube section, the plurality of cooling fins has a length and position relative to the first tube section, and the length and position of the ceramic liner within the first tube section corresponds to the length and position of the cooling fins surrounding the first tube section. The invention preferably further comprises a main flange that is situated between the cooling fins and the first flange and that comprises two apertures through which the front ends of the first and second tube sections extend.

In a preferred embodiment, the invention further comprises a dual-pronged spray washer rail that extends rearward from the main flange above the plurality of cooling fins and that is configured to direct high-pressure water into the cooling fins for pressure washing. Preferably, the spray washer rail is comprised of a first extension member that extends rearwardly from the main flange above one side of the plurality of cooling fins and that is connected to a spray washer valve, the spray washer valve comprises a second extension member that is parallel to the first extension member and that extends rearwardly from the main flange above another side of the plurality of cooling fins, and the spray washer valve further comprises a connection member that connects the first and second extension members on an end of the spray washer rail that is proximate to an inside surface of the main flange.

In a preferred embodiment, the first and second extension members each comprises a plurality of spray washer nozzles spaced an equal distance apart along a length of each extension member. Preferably, the invention further comprises a burner lighting pipe that extends downwardly from the front end of the first tube section between the first flange and the main flange. The main flange preferably comprises a threaded opening that is configured to accept a borescope and that is situated on one side of the main flange between the first and second tube sections.

In a preferred embodiment, an outer surface of each of the first, second and third tube sections is covered with a layer of thermally conductive material. In another preferred embodiment, an outer surface of each of the first, second and third tube sections is covered with a ceramic coating. Preferably, the first tube section is comprised of a nickel-molybdenum-chromium-iron-tungsten alloy, and the second and third tube sections are each comprised of stainless steel.

In a preferred embodiment, the invention further comprises a stopper in the form of a rail that extends forwardly from the rear end of the first tube section and abuts up against a rear-most surface of the ceramic liner. Preferably, the upper set of cooling fins has a height, the lower set of cooling fins has a height, and the height of the upper set of cooling fins is greater than the height of the lower set of cooling fins. The invention preferably further comprises a bottom rail that extends downwardly from the lower set of cooling fins, has a longitudinal axis that is parallel to a longitudinal axis of the first tube section, and is centered beneath the lower set of cooling fins.

REFERENCE NUMBERS

Figure 1:
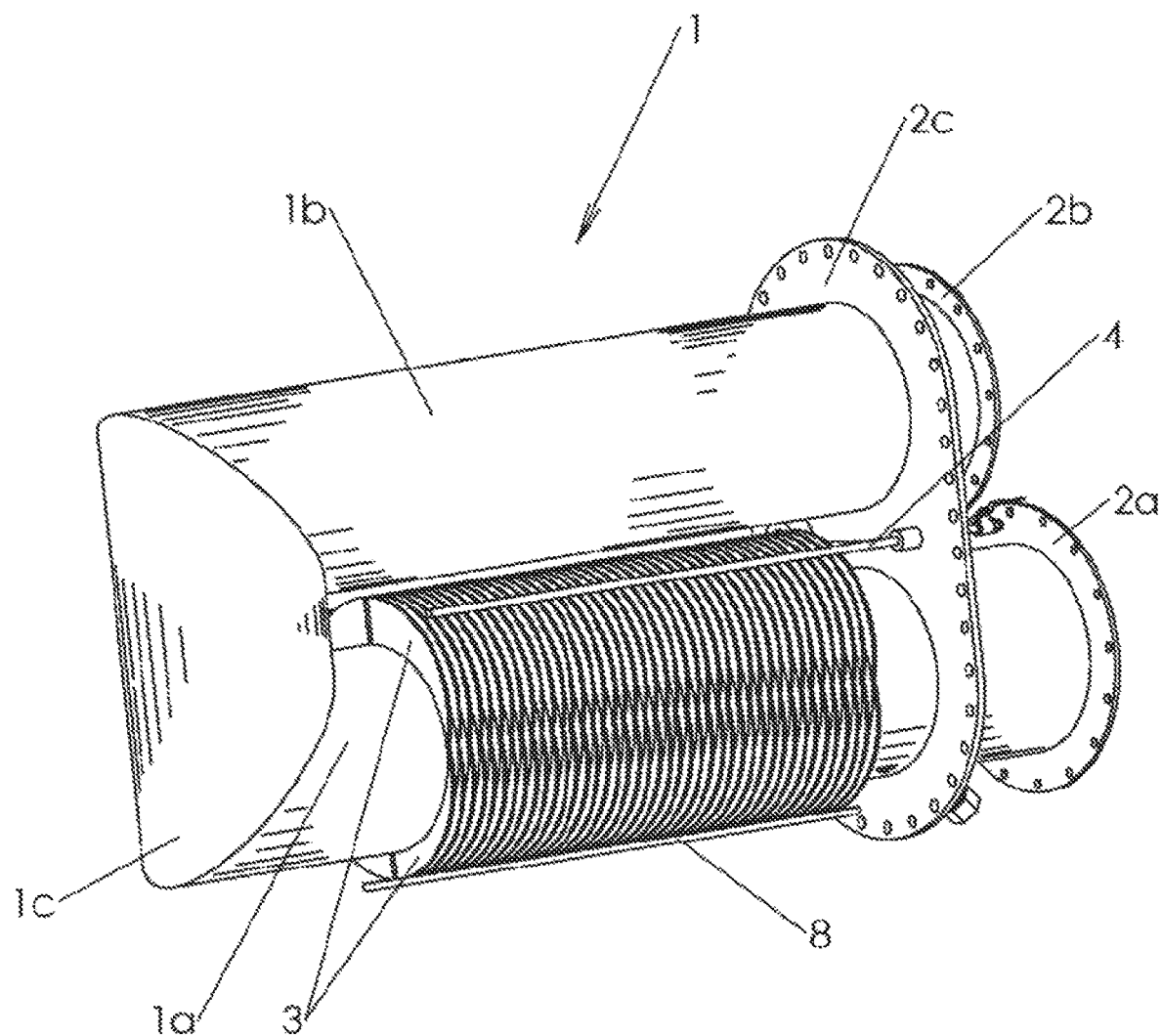
FIG. 1 is a rear perspective view of the present invention.

1 Present invention (fire tube)
1a First tube section
1b Second tube section
1c Third tube section
2a First flange
2b Second Flange
3 Cooling fins
3a Upper cooling fins
3b Lower cooling fins
3c First center rail
3d Second center rail
4 Spray washer rail
4a First extension member
4b Second extension member
4c Connection member
5 Burner lighting pipe
6 Threaded opening
7 Spray washer valve
8 Bottom rail
9 Ceramic liner
9a Ceramic liner section
9b Front end (of ceramic liner section)

9c Rear end (of ceramic liner section)
10 Spray washer nozzle
11 Burner
12 Burner chimney

DETAILED DESCRIPTION OF INVENTION

A. Overview

The present invention overcomes the disadvantages of existing fire tubes by fabricating the fire tube out of a corrosion-resistant alloy and incorporating other structural features that extend the life of the fire tube and minimize maintenance requirements. These structural features include (i) cooling fins on the lower tube surrounding the burner to prevent the metal in this area of the tube from corroding and oxidizing and (ii) a ceramic cylinder (or liner) inserted into the tube on the lower portion of the tube near the burner. The ceramic liner absorbs the heat from the burner and then transfers that heat outward to the lower portion of the fire tube and the cooling fins, thereby providing a more uniform distribution of the heat generated from the burner and greater efficiency in heating the treater vessel.

Other structural improvements include: (iii) a bar at the bottom of the lower tube to facilitate installation of the fire tube; (iv) a spray washer rail situated on top of the lower cooling fins and configured to direct high-pressure water into the fins for pressure washing; and (v) a threaded opening for insertion of a borescope to observe and inspect the upper portion of the lower fire tube without removing it. With these structural improvements, maintenance on the fire tube can be performed by draining the vessel, attaching the pressure washer for removal of the sludge around the cooling fins, inserting a borescope and conducting the visual inspection. The present invention is engineered for a life expectancy of five or more years without requiring removal of the fire tube.

B. Detailed Description of the Figures

FIG. 1 is a rear perspective view of the present invention. As shown in this figure, the invention 1 comprises two parallel tube sections 1a, 1b joined by a third tube section 1c that is situated at the rear end of each of the first and second tube sections 1a, 1b. The third tube section 1c is oriented so that its longitudinal axis is perpendicular to the longitudinal axes of the first and second tube sections 1a, 1b. Each tube section 1a, 1b, 1c is hollow. The tube sections 1a, 1b, 1c are optionally coated on the outside with a layer of thermally conductive material such as copper or aluminum and/or a ceramic coating. Each of the first and second tube sections 1a, 1b comprises an open front end that terminates in a flange 2a, 2b. The front end of each of the first and second tube sections 1a, 1b, is open (see FIG. 2). The three tube sections 1a, 1b, 1c are configured to provide a fluid channel through the open end of the first tube section 1a at the first flange 2a, through the first tube section 1a, through the third tube section 1c, through the second tube section 1b, and out the open end of the second tube section 1b at the second flange 2b.

In a preferred embodiment, the first tube section 1a is comprised of C276 alloy. The C276 alloy is a nickel-molybdenum-chromium-iron-tungsten alloy engineered to have excellent corrosion resistance in a wide range of severe environments. The high nickel and molybdenum contents make the alloy especially resistant to pitting and crevice corrosion in reducing environments, and the chromium imparts resistance to oxidizing media. The low carbon content minimizes carbide precipitation during welding to maintain corrosion resistance in as-welded structures. This alloy is resistant to the formation of grain boundary precipitates in the weld heat-affected zone, thus making it suitable for most chemical process applications in an as-welded condition. The C276 alloy is largely used in the most severe environments, such as chemical processing, pollution control, pulp and paper production, industrial and municipal waste treatment, and recovery of sour natural gas.

The second tube section 1b and third tube section 1c are preferably comprised of 316L stainless steel, which is an austenitic chromium-nickel stainless steel that contains between two and three percent molybdenum. The molybdenum content increases corrosion resistance, improves resistance to pitting in chloride ion solutions, and increases strength at high temperatures. Type 316 grade stainless steel is particularly effective in acidic environments. This grade of steel is effective in protecting against corrosion caused by sulfuric, hydrochloric, acetic, formic and tartaric acids, as well as acid sulfates and alkaline chlorides. Although the 316L stainless steel is less expensive than the C276 alloy, the latter alloy is preferably used in the first tube section 1a because this is the hottest section of the fire tube (the burner assembly is located within this section of the fire tube).

In a preferred embodiment, a plurality of cooling fins 3 surrounds at least a portion of the mid-section of the first tube section 1a; this is the portion of the tube that contains the burner assembly (not shown). In this context, the term "mid-section" refers to that part of the first tube section 1a that is between the main flange 2c and the third tube section 1c. The cooling fins are shown in greater detail in FIG. 4. A dual-pronged spray washer rail 4 extends rearward from the main flange 2c across the top of the cooling fins 3 (see FIG. 3). The purpose of the cooling fins 3 is to help dissipate the heat created by the burner (not shown) within the first tube section 1a.

Figure 2:
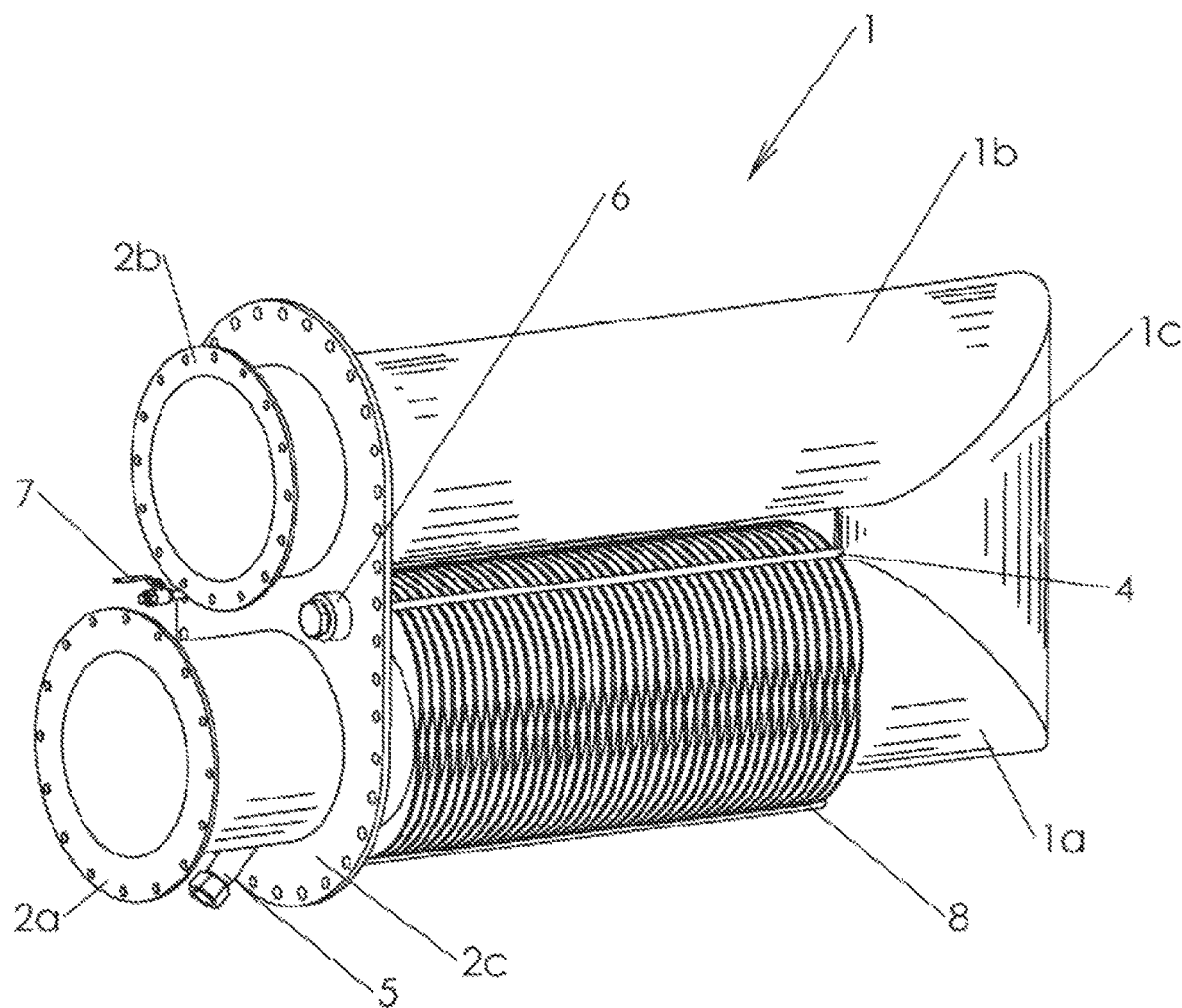
FIG. 2 is a front perspective view of the present invention.

FIG. 2 is a front perspective view of the present invention. As shown in this and the preceding figure, a main flange 2c comprises two apertures through which the front ends of the first and second tube sections 1a, 1b extend. The main flange 2c is situated behind the first and second flanges 2a, 2b but in front of the cooling fins 3 on the first tube section 1a. A burner lighting pipe 5 extends downwardly from the front end of the first tube section 1a between the first flange 2a and the main flange 2c. The purpose of the burner lighting pipe 5 is to allow access to light the burner (not shown). A threaded opening 6 on the main flange 2c is configured so that a borescope (not shown) can be attached to the threaded opening 6 for viewing of the fire tube behind the main flange 2c. In this particular embodiment, the threaded opening 6 is situated on one side of the main flange 2c between the first and second tube sections 1a, 1b. The spray washer valve 7 on the outside of the main flange 2c is connected to the spray washer rail 4 (see FIG. 3).

Figure 3:
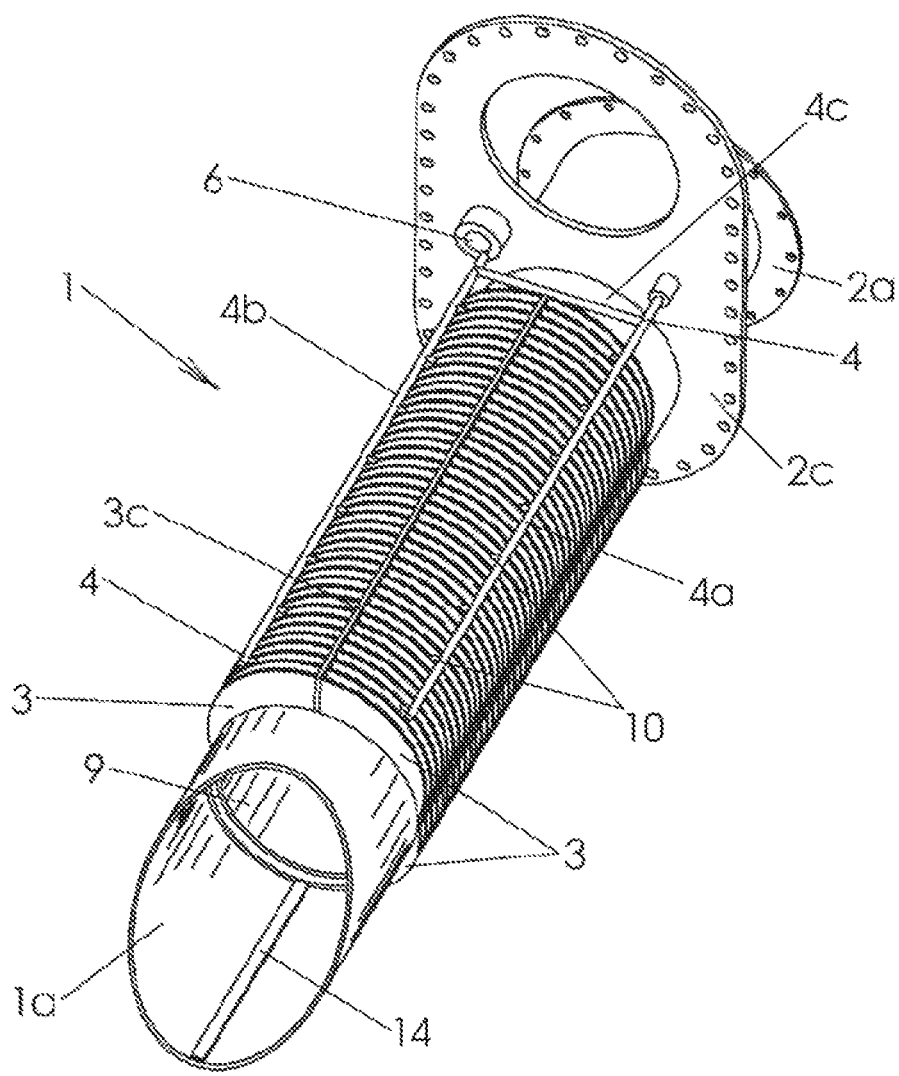
FIG. 3 is a rear perspective view of the present invention with the second and third tube sections and the second flange removed.

FIG. 3 is a rear perspective view of the present invention with the second and third tube sections 1b, 1c and second flange 2b removed. This figure shows the ceramic tube 9 or liner that is positioned inside of the first tube section 1a. A stopper 14 in the form of a rail extends forwardly from the rear end of the first tube section 1a and abuts up against the rear-most surface of the ceramic liner 9. The stopper 14 may be attached to the inside of the first tube section 1a in any manner; however, in a preferred embodiment, it is welded to the inside of the first tube section 1a. The purpose of the stopper 14 is to prevent the ceramic liner 9 from being situated too far rearward within the first tube section 1a. The length and position of the ceramic liner 9 within the first tube section 1a preferably corresponds to the length and position of the cooling fins 3 on the outside of the first tube section 1a.

As shown in this figure, the spray washer rail 4 preferably comprises a first extension member 4a that extends rearwardly of the main flange 2c across the top of one side of the cooling fins 3 and that is connected to the spray washer valve 7. The spray washer rail 4 further comprises a second extension member 4b that is parallel to the first extension member 4a and that extends rearwardly of the main flange 2c across the top of the other side of the cooling fins 3. A connection member 4c connects the first and second extension members 4a, 4b on the end of the spray washer rail 4 that is closest to the inside of the main flange 2c.

Figure 4:
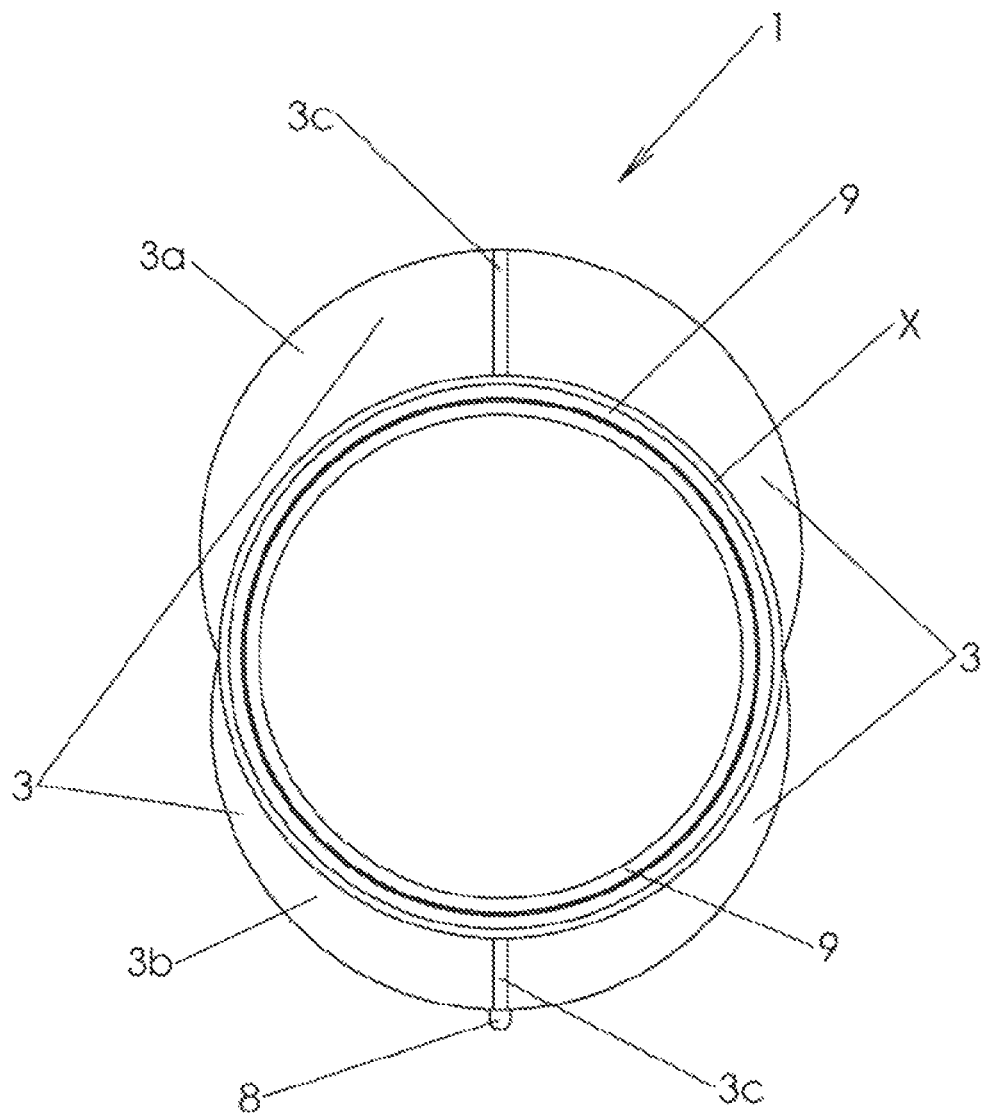
FIG. 4 is a rear view of the invention showing only the cooling fins and ceramic liner.

FIG. 4 is a rear view of the invention showing only the cooling fins and ceramic liner. Note that there is a gap X between the cooling fins 3 and the ceramic liner 9 where the first tube section 1a (not shown) would be. This figure shows the relative size and shape of the cooling fins 3. In a preferred embodiment, the cooling fins 3 comprise an upper set of cooling fins 3a and a lower set of cooling fins 3b. The upper cooling fins 3 are preferably larger in size (height) than the lower cooling fins 3b; this extra height enables the upper cooling fins 3a to catch and contain debris and sludge that may collect on top of the first tube section 1a. Each set of cooling fins 3a, 3b is preferably crescent-shaped with the ends of the two crescents terminating on each side of the first tube section 1a. With this configuration, the cooling fins 3 provide the greatest cooling capacity at the top and bottom of the first tube section 1a where the crescents are the largest in diameter. In a preferred embodiment, the cooling fins 3 are comprised of stainless steel. In this particular embodiment, the cooling fins 3 are welded to the outside surface of the first tube section 1a.

Figure 5:
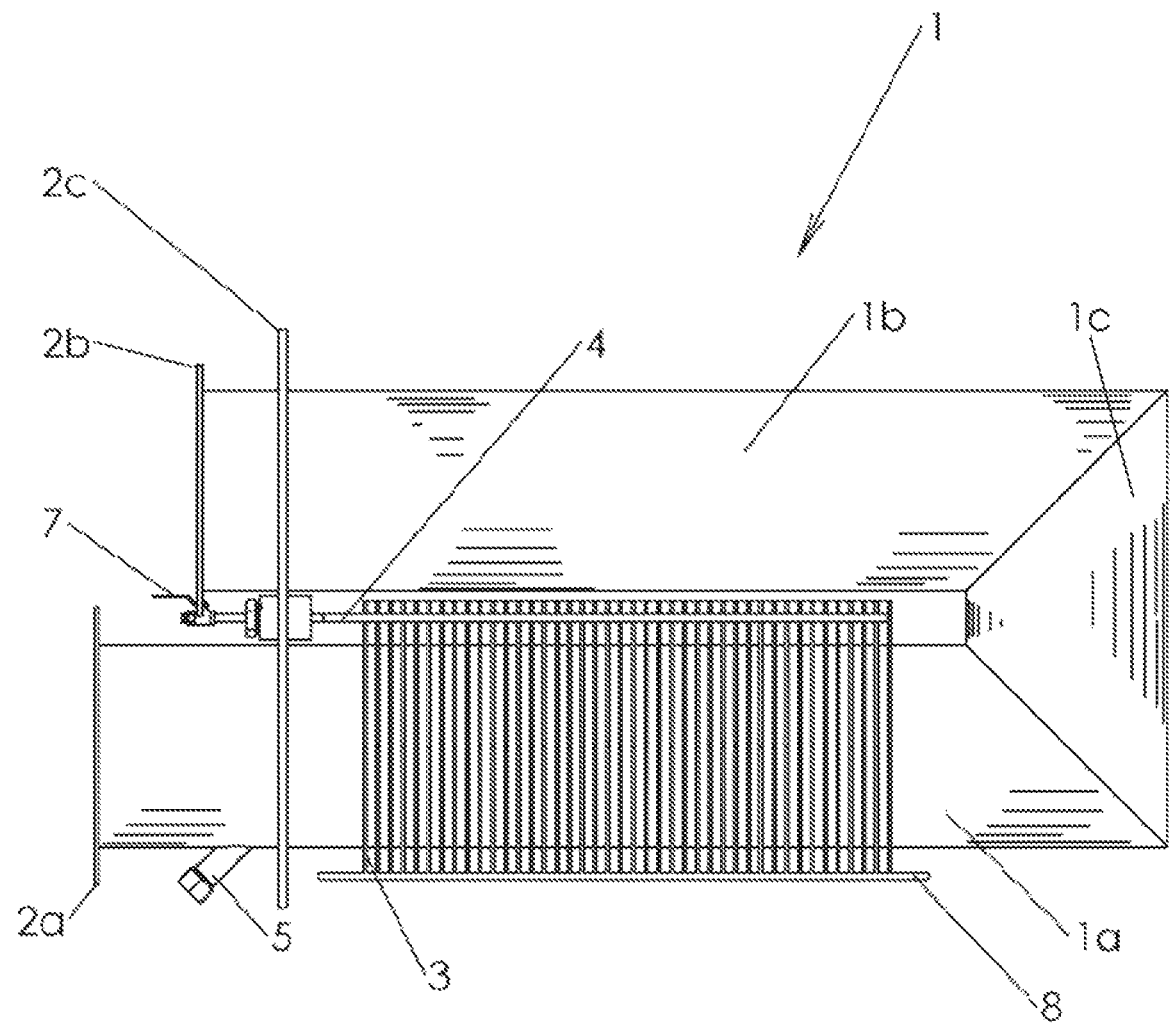
FIG. 5 is a side view of the present invention.

FIG. 5 is a side view of the present invention. In one embodiment of the present invention, a bottom rail 8 extends downwardly from the lower cooling fins 3b. The purpose of this bottom rail 8 is to protect the lower cooling fins 3b from contact with the ground or another surface when the fire tube is being installed or removed; when the fire tube is installed within the heater-treater, it is suspended so that the lower cooling fins 3b do not come into contact with the bottom flange on the heater treater (see FIG. 11). There is preferably a space between the lower cooling fins 3b and this bottom flange.

Figure 6:
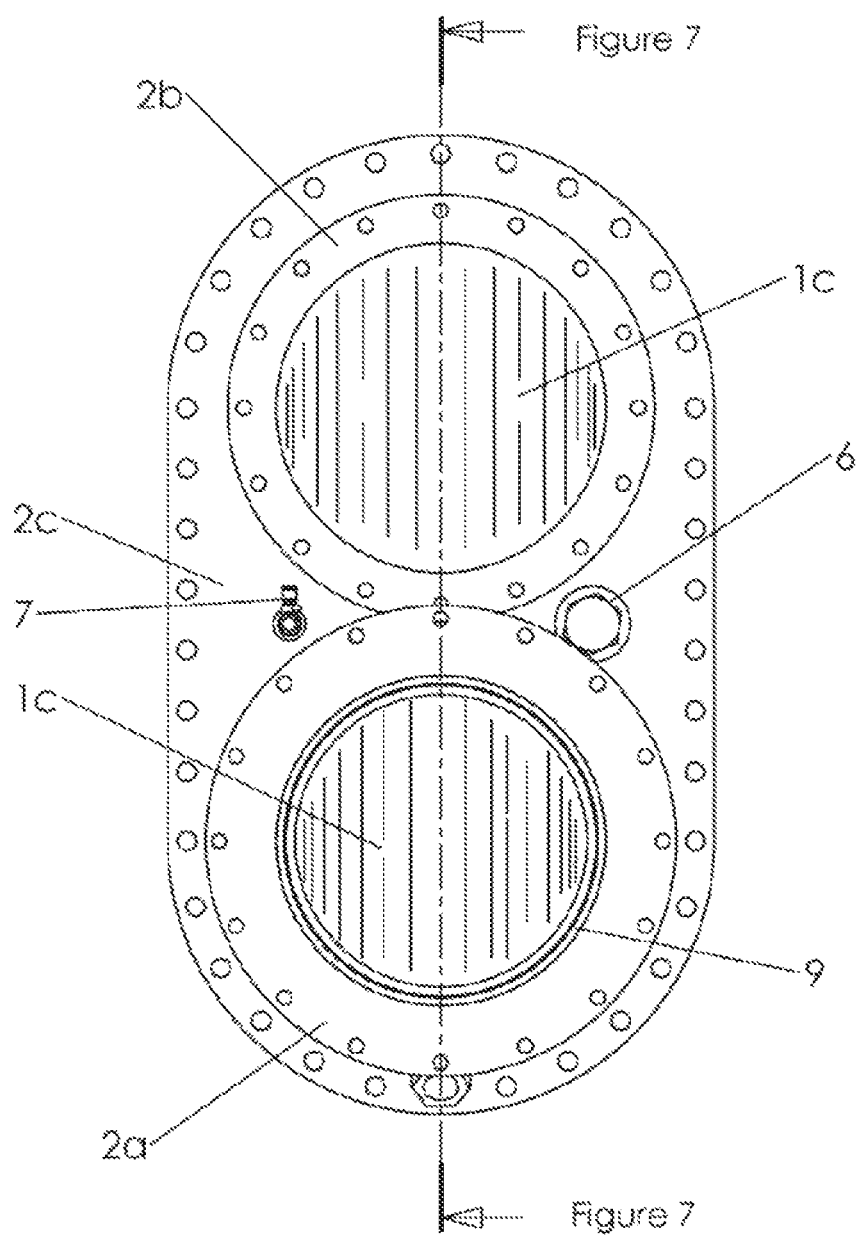
FIG. 6 is a front view of the present invention showing the section line for FIG. 7.
Figure 7:
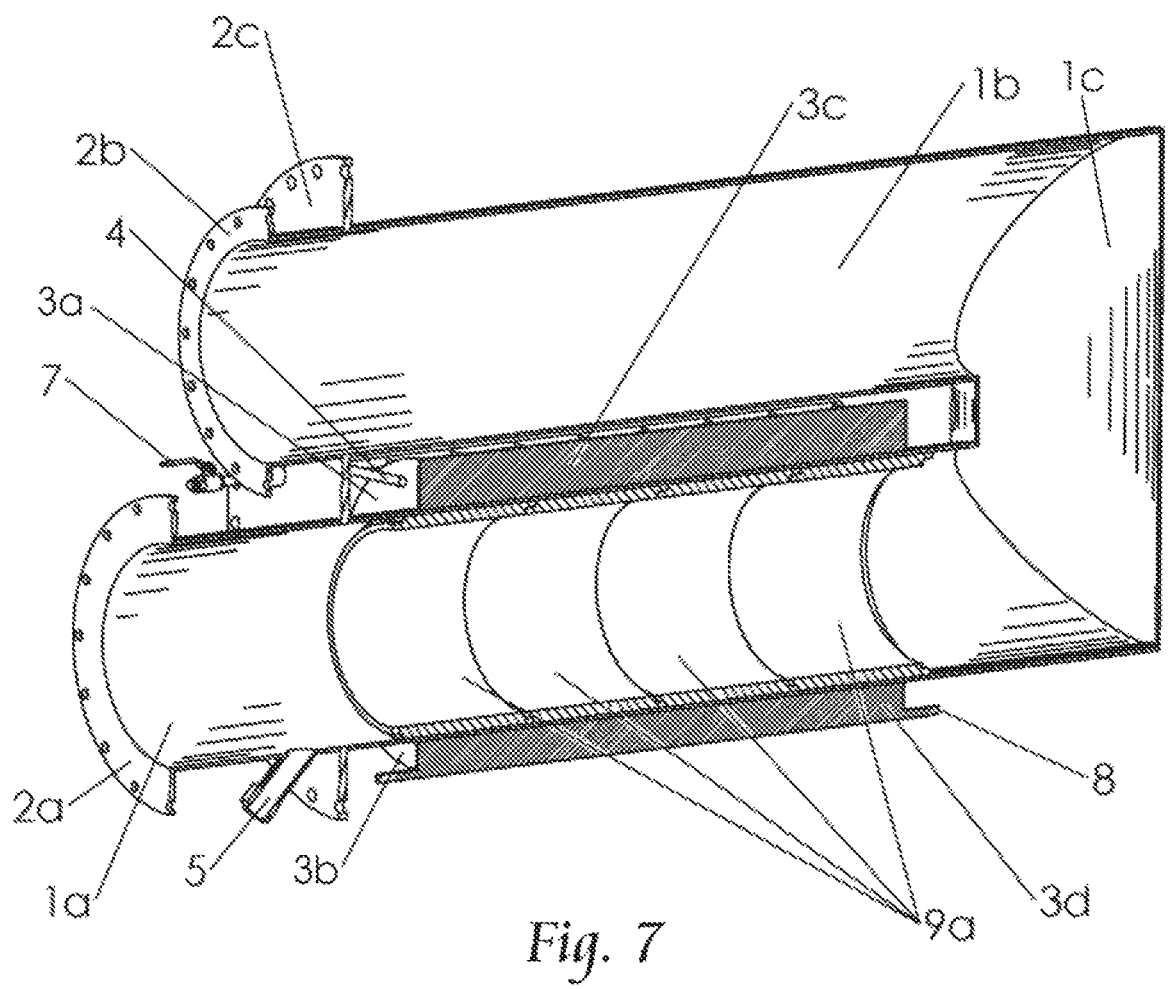
FIG. 7 is a section view of the present invention.

FIG. 6 is a front view of the present invention showing the section line for FIG. 7. FIG. 7 is a section view of the present invention. As shown in this figure, the upper cooling fins 3a are separated in the center (at the top of the first tube section 1a) by a first center rail 3c that extends longitudinally along the length of the upper cooling fins 3a. The lower cooling fins 3b are separated in the center (at the bottom of the first tube section 1a) by a second center rail 3d that extends longitudinally along the length of the lower cooling fins 3b. The bottom rail 8 is attached (for example, welded) to the bottom of the second center rail 3d and extends beyond the second center rail 3d both forwardly and rearwardly, as shown.

Figure 8:
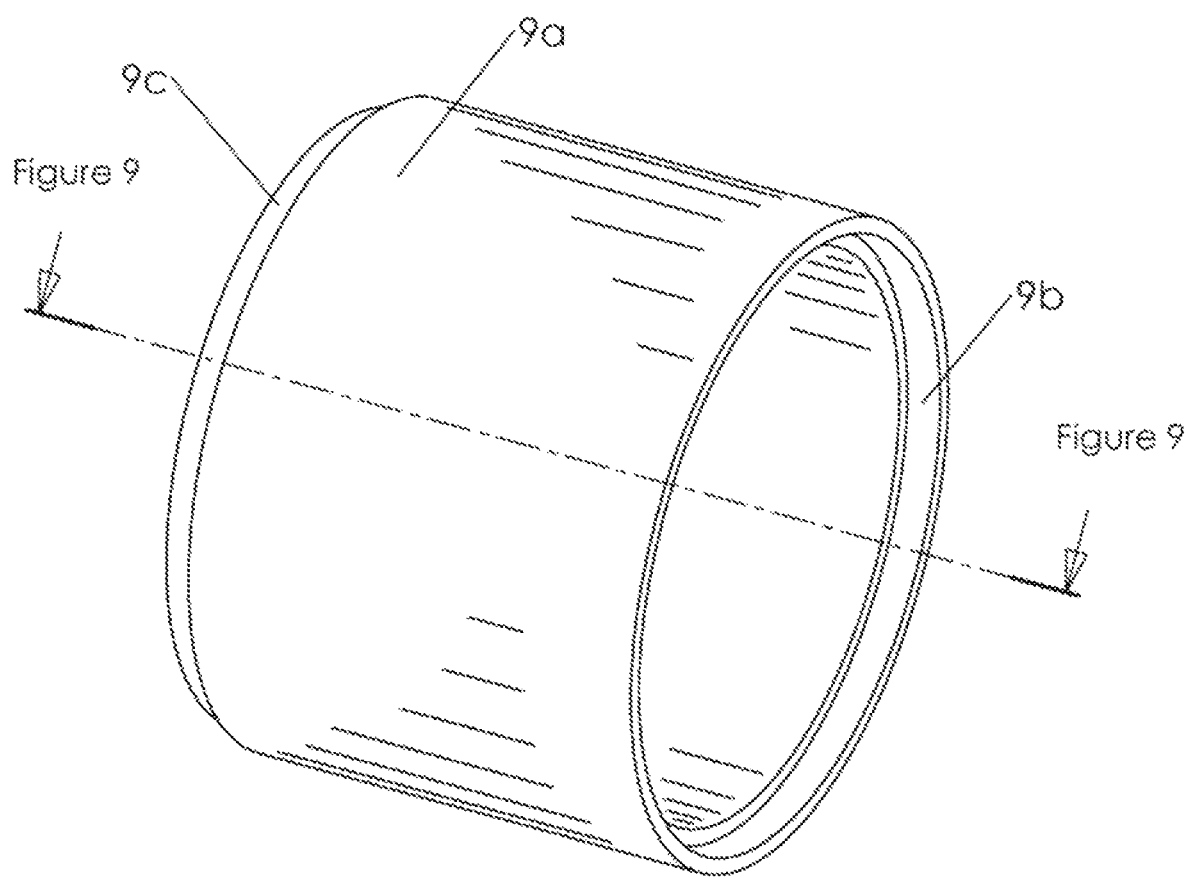
FIG. 8 is a perspective view of one of the sections of the ceramic liner of the present invention.
Figure 9:
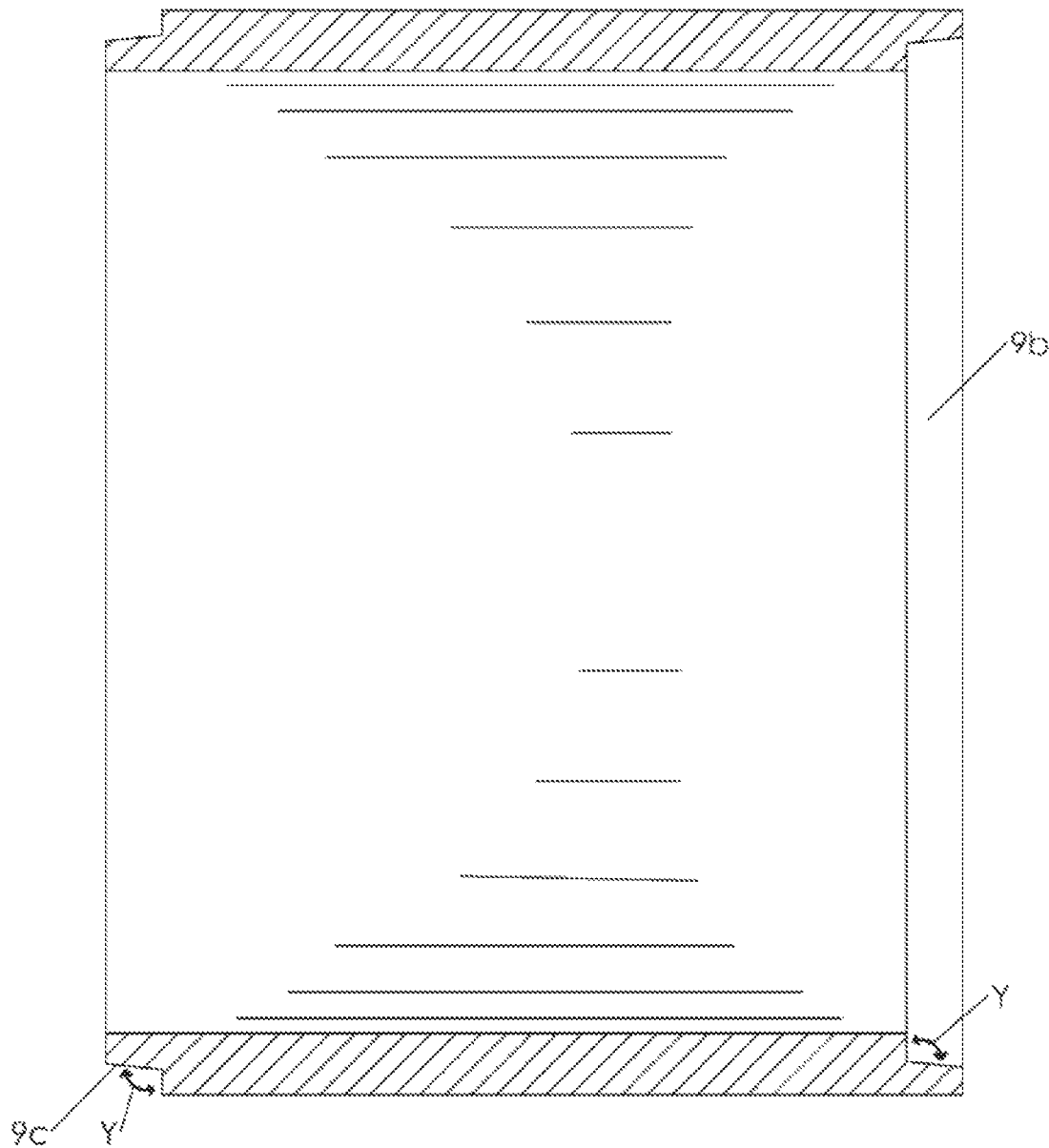
FIG. 9 is a section view of the ceramic liner section taken at the section line shown in FIG. 8.

FIG. 8 is a perspective view of one of the sections of the ceramic liner of the present invention. In a preferred embodiment, the ceramic liner 9 is comprised of four separate tubular sections 9a, one of which is shown in FIG. 8. FIG. 9 is a section view of the ceramic liner section taken at the section line shown in FIG. 8. As shown in this figure, the front end (right side of FIG. 9) of each ceramic liner section 9a preferably comprises a circumferential recess 9b into which the rear end of an adjacent ceramic liner section 9a fits. The rear end (left side of FIG. 9) of each ceramic liner section 9a comprises a circumferential protrusion 9c that fits into the circumferential recess 9b on the front end of an adjacent ceramic liner 9a. In a preferred embodiment, the angle shown as "Y" on. FIG. 9 is one hundred thirteen (113) degrees. This angle facilities the coupling of adjacent ceramic liner sections 9a.

Figure 10:
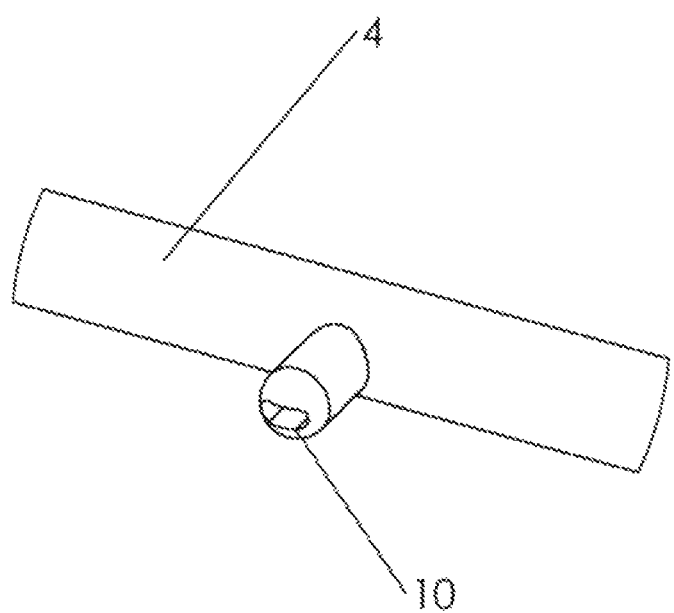
FIG. 10 is a detail perspective view of the spray washer nozzle of the present invention.

FIG. 10 is a detail perspective view of the spray washer nozzle of the present invention. As shown in FIG. 3, each of the first and second extension members 4a, 4b of the spray washer rail 4 comprises a plurality of spray washer nozzles 10 spaced an equal distance apart along the length of the extension member. Each spray washer nozzle is positioned to spray water onto the upper cooling fins 3a, thereby cleaning away the debris and sludge that has collected there. In a preferred embodiment, the spray washer nozzles 10 are wide-mouthed nozzles, as shown in FIG. 10.

Figure 11:
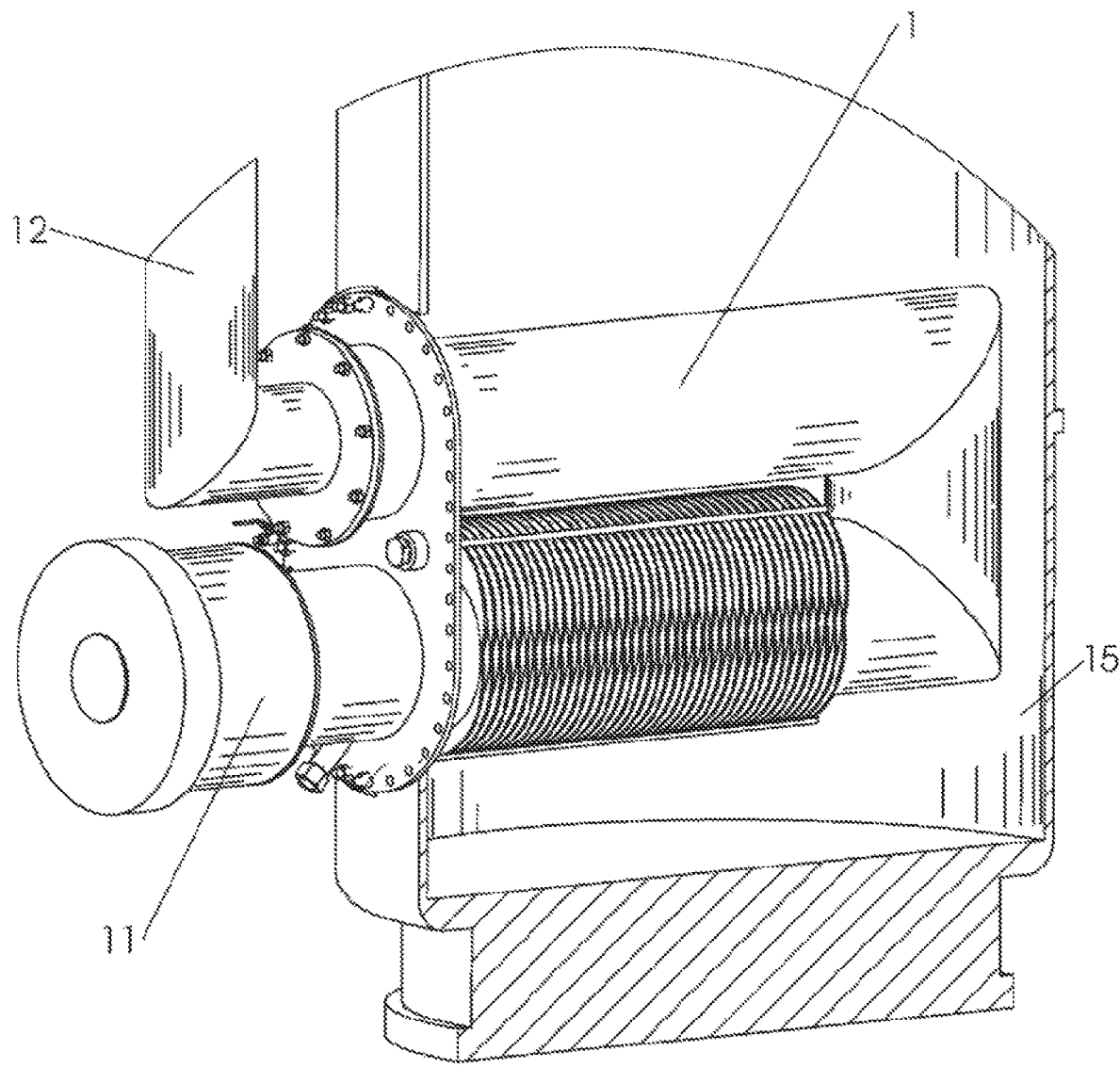
FIG. 11 is a cutaway view of the present invention installed on a heater treater.

FIG. 11 is a cutaway view of the present invention installed on a heater treater. When the present invention is installed on a heater treater, the first flange 2a is bolted to the burner 11, and the second flange 2b is bolted to the chimney 12. Although the first flange 2a is shown as extending further forward than the second flange 2b, the invention is not limited to such a configuration. The burner 11 extends from the first flange 2a through the main flange 2c and into the first tube section 1a. The burner has been omitted from the previous figures.

Figure 12:
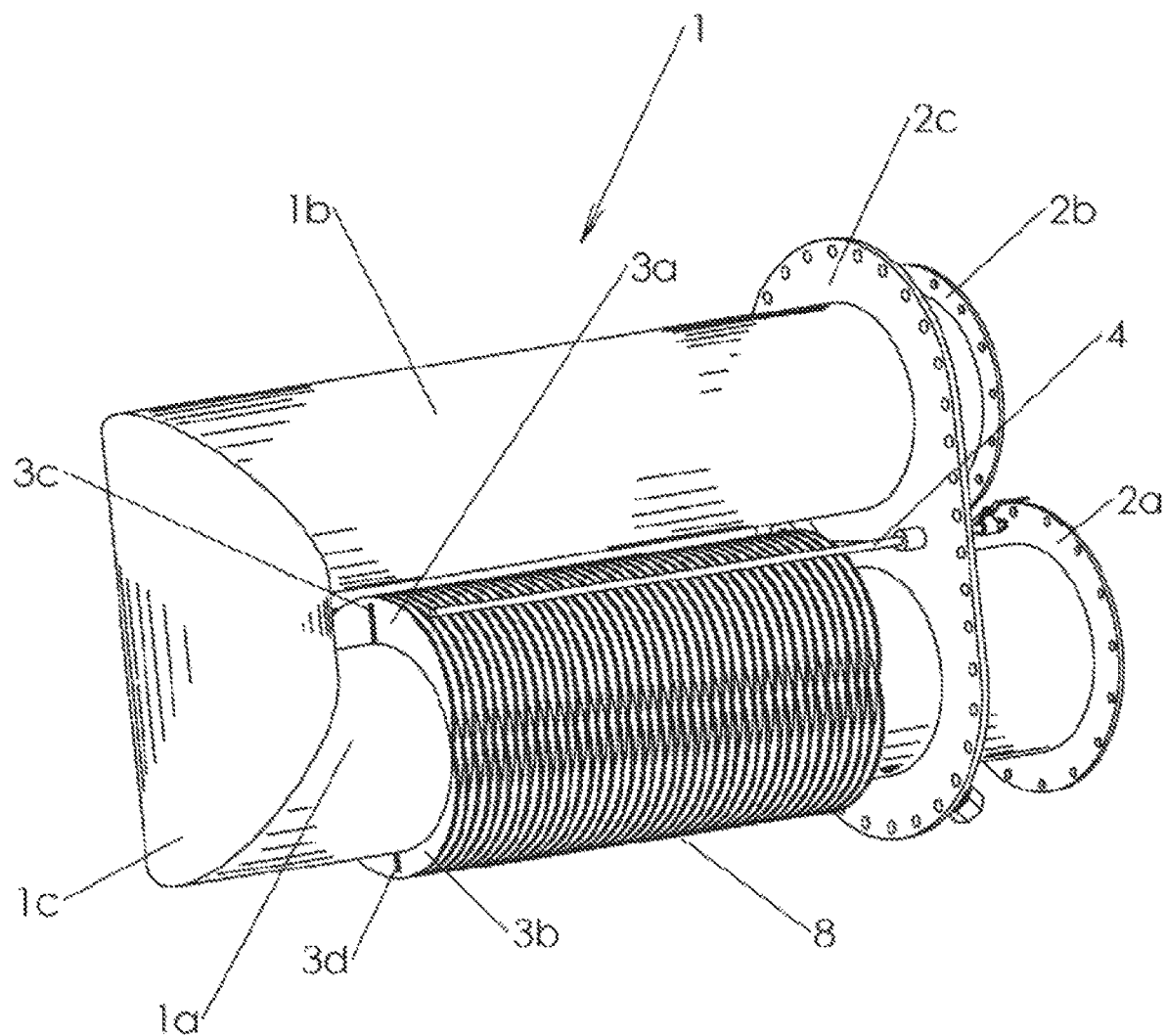
FIG. 12 is a rear perspective view of the present invention showing a first alternate embodiment of the cooling fins.

FIG. 12 is a rear perspective view of the present invention showing a first alternate embodiment of the cooling fins. This embodiment is similar to that shown in FIG. 1 except that the cooling fins 3 fit over the first center rail 3c (in the case of the upper cooling fins 3a) and the second center rail 3d (in the case of the lower cooling fins 3b) rather than abutting up against them. Thus, there is a central notch in each of the upper and lower cooling fins 3a, 3b that is configured to accept the first or second center rail 3c, 3d. The shape of the cooling fins 3a, 3b is otherwise the same as described above in connection with the first embodiment. In this particular embodiment, the cooling fins 3a, 3b are press fit onto the center rails 3a, 3b, thereby minimizing the amount of welding required (as compared to the first embodiment, which requires the cooling fins 3 to be welded to the center rails 3a, 3b).

Figure 13:
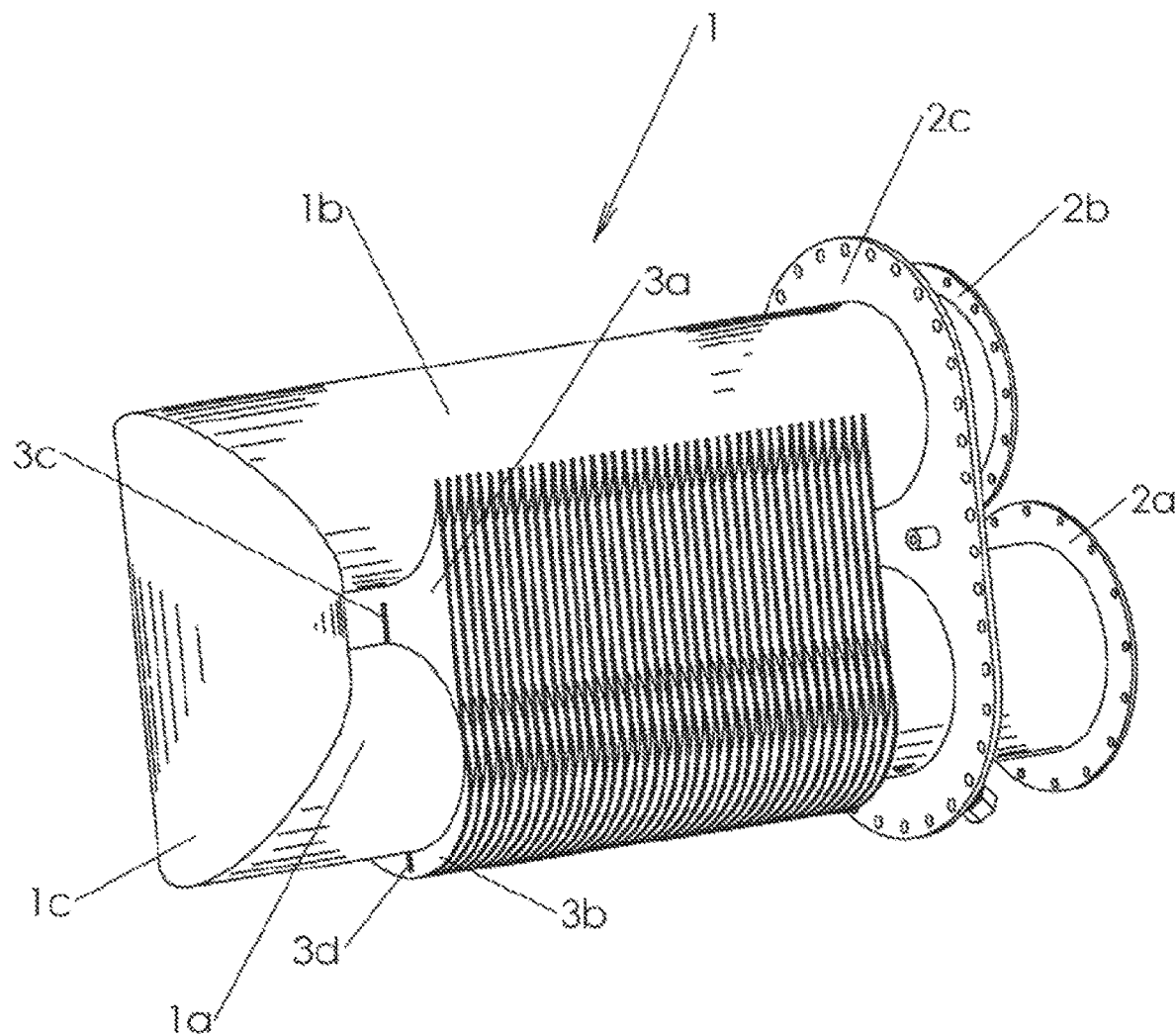
FIG. 13 is a rear perspective view of the present invention showing a second alternate embodiment of the cooling fins.

FIG. 13 is a rear perspective view of the present invention showing a second alternate embodiment of the cooling fins. This embodiment is similar to the embodiment shown in FIG. 12 except that the upper cooling fins 3a are extended upward and configured to surround the lower half of the second tube section 1b, as shown. This particular embodiment provides more cooling fin surface area, which maximizes heat transfer, and reduces sludge buildup in the cooling fin area. The buildup of sludge in the cooling fin area may cause a loss of efficiency.

Figure 14:
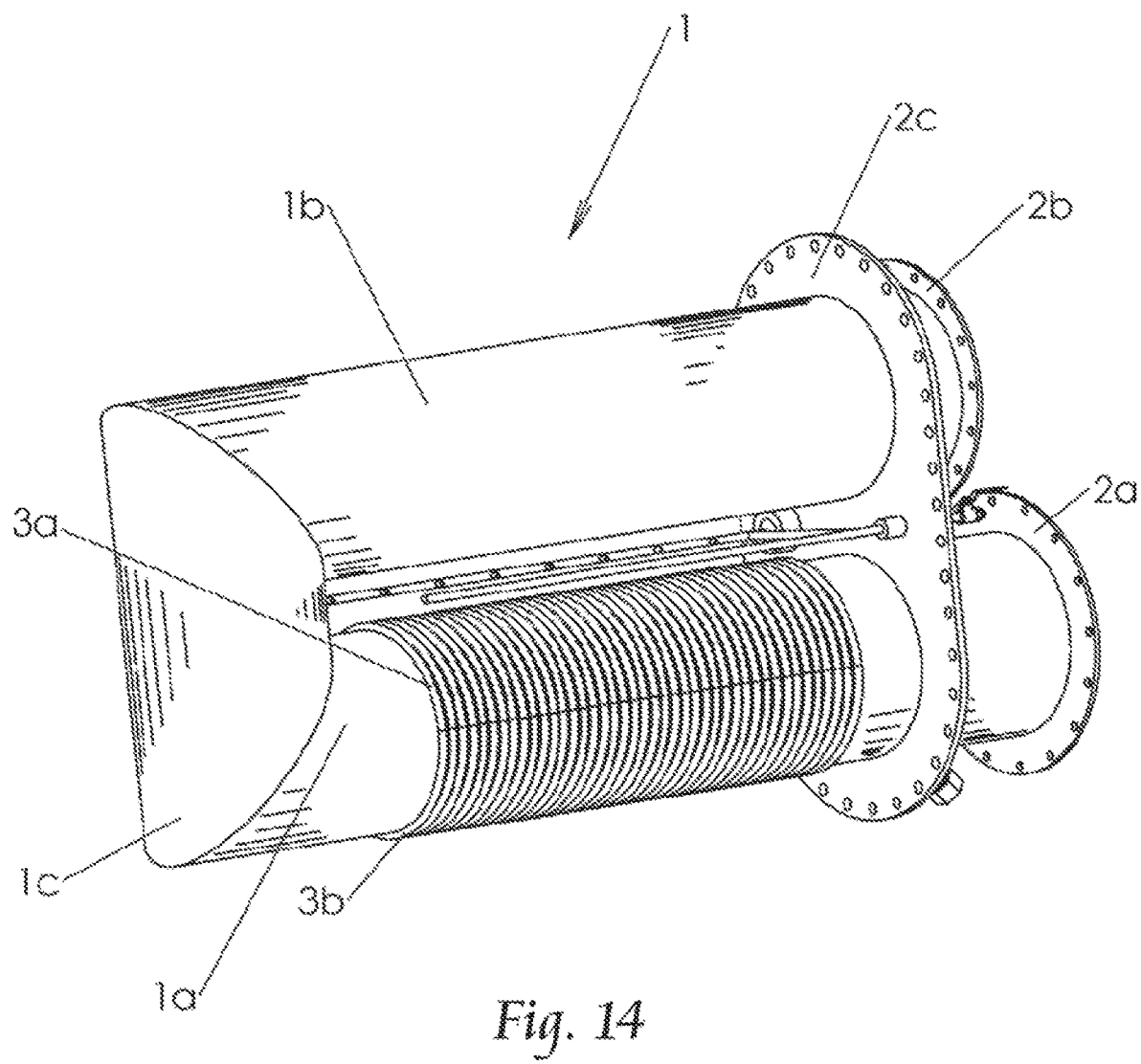
FIG. 14 is a rear perspective view of the present invention showing a third alternate embodiment of the cooling fins.
Figure 15:
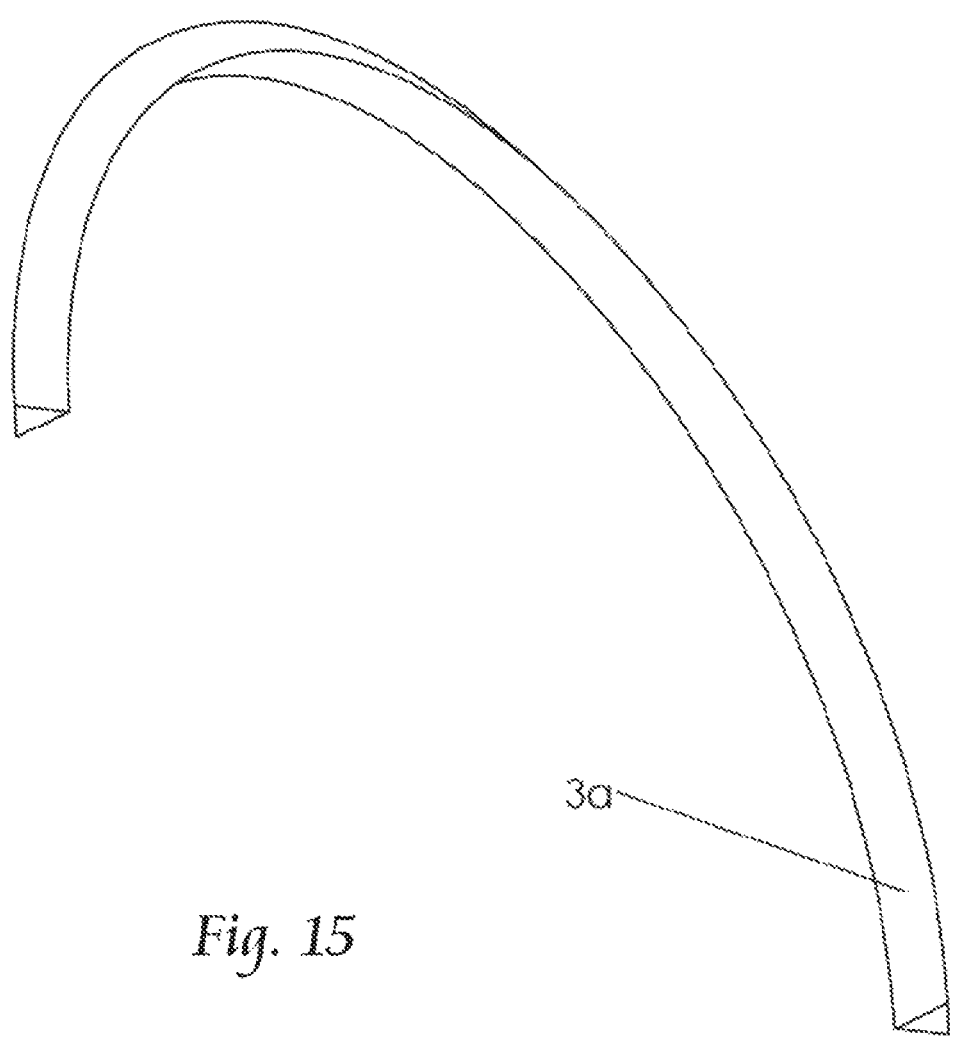
FIG. 15 is a perspective view of one of the cooling fins shown in FIG. 14.

FIG. 14 is a rear perspective view of the present invention showing a third alternate embodiment of the cooling fins. In this embodiment, the upper and lower cooling fins 3a, 3b are comprised of a plurality of concentric rings that are configured to fit around the outer circumference of the first tube section 1a. Each of these concentric rings is triangular in cross-section (see FIG. 15). This particular embodiment, when combined with a highly thermally conductive metal layer followed by a ceramic coating (to prevent corrosion) applied over the cooling fins 3a, 3b and first tube section 1a, allows for good heat transfer with less material use.

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A fire tube comprising:
   (a) a first tube section comprised of a first length of hollow tube, a second tube section comprised of a second length of hollow tube, and a third tube section comprised of a third length of hollow tube, wherein the third tube section is situated at a rear end of each of the first and second tube sections and is oriented so that a longitudinal axis of the third tube section is perpendicular to a longitudinal axis of each of the first and second tube sections, wherein the first tube section comprises an open front end that terminates in a first flange, wherein the second tube section comprises an open front end that terminates in a second flange, and wherein the first, second and third tube sections are configured to provide a fluid channel through the open end of the first tube section at the first flange, through the first rube section, through the third tube section, through the second tube section, and out the open end of the second tube section at the second flange;
   (b) a plurality of cooling fins that are configured to surround at least a portion of a mid-section of the first tube section, wherein the plurality of cooling fins comprises an upper set of cooling fins that surrounds an upper part of the first tube section and a lower set of cooling fins that surrounds a lower part of the first tube section; and
   (c) a tubular and hollow ceramic liner that is situated inside of the first tube section, the ceramic liner comprising one or more separate tubular sections, wherein the ceramic liner comprises two or more separate tubular sections, each of which comprises a front end with a circumferential recess and a rear end with a circumferential protrusion that is configured to fit into the circumferential recess on the front end of an adjacent tubular section.

2. The fire tube of claim 1, further comprising a main flange that is situated between the cooling fins and the first flange, the main flange comprising two apertures through which the front ends of the first and second tube sections extend.

3. The fire tube of claim 2, further comprising a dual-pronged spray washer rail that extends rearward from the main flange above the plurality of cooling fins;
   wherein the spray washer rail is configured to direct high-pressure water into the cooling fins for pressure washing.

4. The fire tube of claim 3, wherein the spray washer rail is comprised of a first extension member that extends rearwardly from the main flange above one side of the plurality of cooling fins and that is connected to a spray washer valve;
   wherein the spray washer valve comprises a second extension member that is parallel to the first extension member and that extends rearwardly from the main flange above another side of the plurality of cooling fins; and
   wherein the spray washer valve further comprises a connection member that connects the first and second extension members on an end of the spray washer rail that is proximate to an inside surface of the main flange.

5. The fire tube of claim 4, wherein the first and second extension members each comprises a plurality of spray washer nozzles spaced an equal distance apart along a length of each extension member.

6. The fire tube of claim 2, further comprising a burner lighting pipe that extends downwardly from the front end of the first tube section between the first flange and the main flange.

7. The fire tube of claim 2, wherein the main flange comprises a threaded opening that is configured to accept a borescope, the threaded opening being situated on one side of the main flange between the first and second tube sections.

8. The fire tube of claim 2, wherein an outer surface of each of the first, second and third tube sections is covered with a layer of thermally conductive material.

9. The fire tube of claim 1, wherein an outer surface of each of the first, second and third tube sections is covered with a ceramic coating.

10. The fire tube of claim 1, wherein the first tube section is comprised of a nickel-molybdenum-chromium-iron-tungsten alloy; and
    wherein the second and third tube sections are each comprised of stainless steel.

11. The fire tube of claim 1, further comprising a stopper in the form of a rail that extends forwardly from the rear end of the first tube section and abuts up against a rear-most surface of the ceramic liner.

12. The fire tube of claim 1, wherein the upper set of cooling fins has a height, the lower set of cooling fins has a height, and the height of the upper set of cooling fins is greater than the height of the lower set of cooling fins.

13. The fire tube of claim 1, further comprising a bottom rail that extends downwardly from the lower set of cooling fins, wherein the bottom rail has a longitudinal axis that is parallel to a longitudinal axis of the first tube section, and wherein the bottom rail is centered beneath the lower set of cooling fins.

14. A fire tube comprising:
    (a) a first tube section comprised of a first length of hollow tube, a second tube section comprised of a second length of hollow tube, and a third tube section comprised of a third length of hollow tube, wherein the third tube section is situated at a rear end of each of the first and second tube sections and is oriented so that a longitudinal axis of the third tube section is perpendicular to a longitudinal axis of each of the first and second tube sections, wherein the first tube section comprises an open front end that terminates in a first flange, wherein the second tube section comprises an open front end that terminates in a second flange, and wherein the first, second and third tube sections are configured to provide a fluid channel through the open end of the first tube section at the first flange, through the first tube section, through the third tube section, through the second tube section, and out the open end of the second tube section at the second flange;
    (b) a plurality of cooling fins that are configured to surround at least a portion of a mid-section of the first tube section, wherein the plurality of cooling fins comprises an upper set of cooling fins that surrounds an upper part of the first tube section and a lower set of cooling fins that surrounds a lower part of the first tube section; and
    (c) a tubular and hollow ceramic liner that is situated inside of the first tube section, the ceramic liner comprising one or more separate tubular sections, wherein the ceramic liner has a length and a position within the first tube section, wherein the plurality of cooling fins has a length and position relative to the first tube section, and wherein the length and position of the ceramic liner within the first rube section corresponds to the length and position of the cooling fins surrounding the first tube section.

* * * * *